Nov. 4, 1924.  
J. J. LA DUCER  
MILLING MACHINE  
Filed Sept. 13, 1920  
1,514,540  
3 Sheets-Sheet 1

Inventor  
J. J. La Ducer  
By S. Jay Teller  
Attorney

Nov. 4, 1924.  
J. J. LA DUCER  
MILLING MACHINE  
Filed Sept. 13, 1920   3 Sheets-Sheet 2  
1,514,540

Nov. 4, 1924.　　　　　　　　　　　　　　　　　　　　　1,514,540
J. J. LA DUCER
MILLING MACHINE
Filed Sept. 13, 1920　　　3 Sheets-Sheet 3

Inventor
J. J. La Ducer
By S. Jay Teller
Attorney

Patented Nov. 4, 1924.  1,514,540

UNITED STATES PATENT OFFICE.

JERRY J. LA DUCER, OF HARTFORD, CONNECTICUT, ASSIGNOR TO PRATT & WHITNEY COMPANY, OF NEW YORK, N. Y., A CORPORATION OF NEW JERSEY.

MILLING MACHINE.

Application filed September 13, 1920. Serial No. 409,884.

*To all whom it may concern:*

Be it known that I, JERRY J. LA DUCER, a citizen of the United States, residing at Hartford, in the county of Hartford and State of Connecticut, have invented certain new and useful Improvements in Milling Machines, of which the following is a specification.

This invention relates to milling machines and it is an object of the invention to provide a milling machine having tool supporting means comprising uprights preferably integrally connected and adjustably mounted on the base of the machine, a cutter supporting rail also preferably being provided and vertically adjustably mounted on the uprights.

The invention relates particularly to a standardized milling machine capable of ready interchanging of parts thereof whereby is secured a machine capable of a variety of milling operations. One object of the invention is to provide an improved and more substantial machine of this type.

It is an object of the invention to provide an improved milling machine adapted to readily receive thereon either a horizontal or a vertical spindle mounting, the construction of the various parts of the machine being very rigid and adjustable to various working positions.

Another object of the invention is to provide a milling machine having tool-supporting means comprising uprights preferably integrally connected and adjustably mounted on ways on the base, the uprights being adapted to receive thereon different cutter-supporting rails, each rail having a different spindle construction mounted thereon.

A further object of the invention is the provision of a vertical spindle assembly adapted to be attached to one of the cutter-supporting rails and adapted to be driven by the horizontal cutter spindle thereon.

With the above and other objects in view which will appear as the description proceeds the invention comprises the following described mechanism.

Referring to the figures of the drawings.

Figure 1:
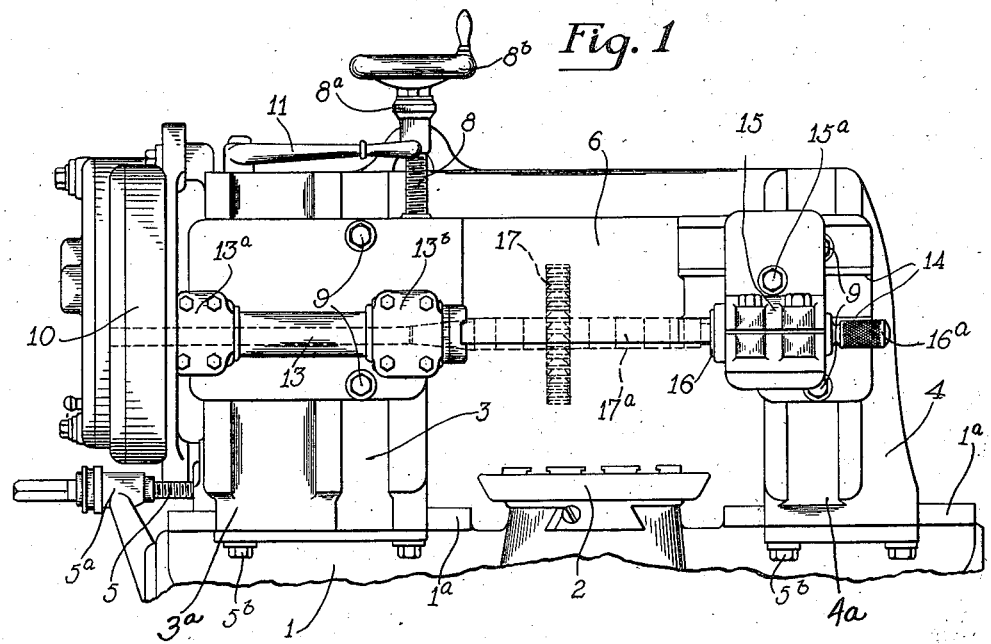
Figure 1 is a front elevation of a portion of a milling machine comprising the present invention and showing a horizontal cutter spindle mounted thereon.

This invention relates particularly to a standardized milling machine capable of ready interchanging of parts and especially the interchanging of the tool-supporting parts whereby is produced a single unitary machine capable of performing various milling machine operations. Broadly, the invention comprises a standard milling machine base including a reciprocating table and cutter-supporting uprights thereon, the uprights being adapted to readily receive thereon a standard cutter-supporting rail. While the general construction of each rail is standard it should be understood that the cutter spindle mounting provided in each rail may be of any construction or arrangement desired. In the drawings I have illustrated certain spindles as being arranged horizontally and other spindles as arranged vertically, it being understood that any arrangement between these two positions may be had if desired.

Referring more specifically to the drawings by reference characters, 1 indicates the base of a milling machine having a work table 2 slidably mounted thereon. The construction of the table and its operating mechanism is preferably of the type illustrated and described in Patent No. 1,231,255 to B. M. W. Hanson, the work table, however, being preferably of the drop-table type such as illustrated in Patents 1,187,730 and 1,347,778 to B. M. W. Hanson. This specific construction, however, comprises within itself no part of the present invention and therefore will not be further described herein.

Adjustably mounted on the ways $1^a$ of the base 1 are two uprights 3 and 4, and in order to secure the maximum rigidity and strength to the cutting tools, I preferably form these parts in one piece, as illustrated in the drawings. The uprights may be adjusted on the ways $1^a$ transversely of the work table by means of a screw 5 journaled into a bracket 5ª on the base and are adapted to be clamped in adjusted position by means of bolts 5ᵇ. The structure as so far described forms the basis or foundation of the herein described milling machine, the construction being a permanent part of the machine and being used in all operations thereof.

Figure 2:
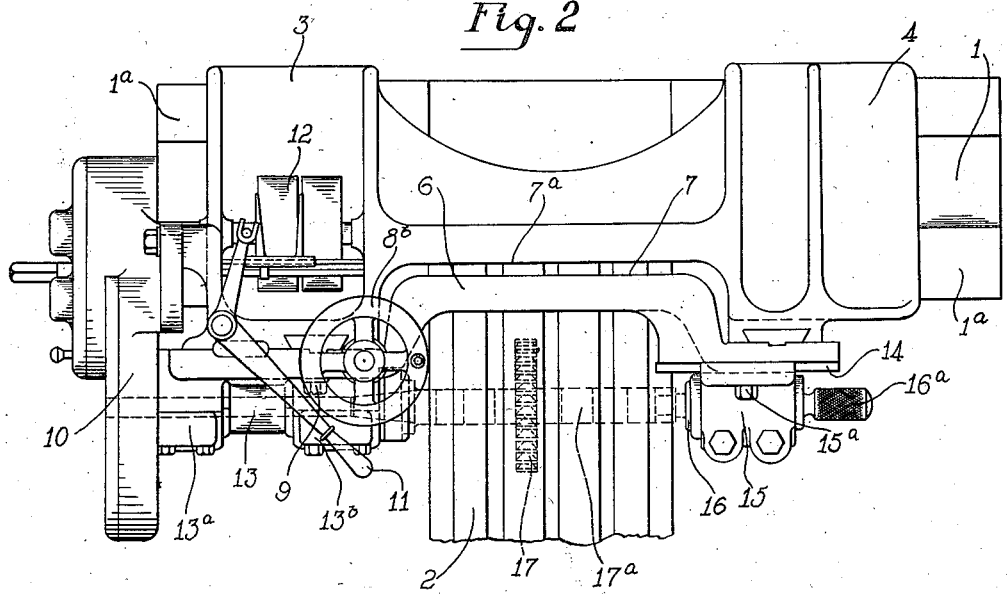
Fig. 2 is a plan view thereof.
Figure 6:
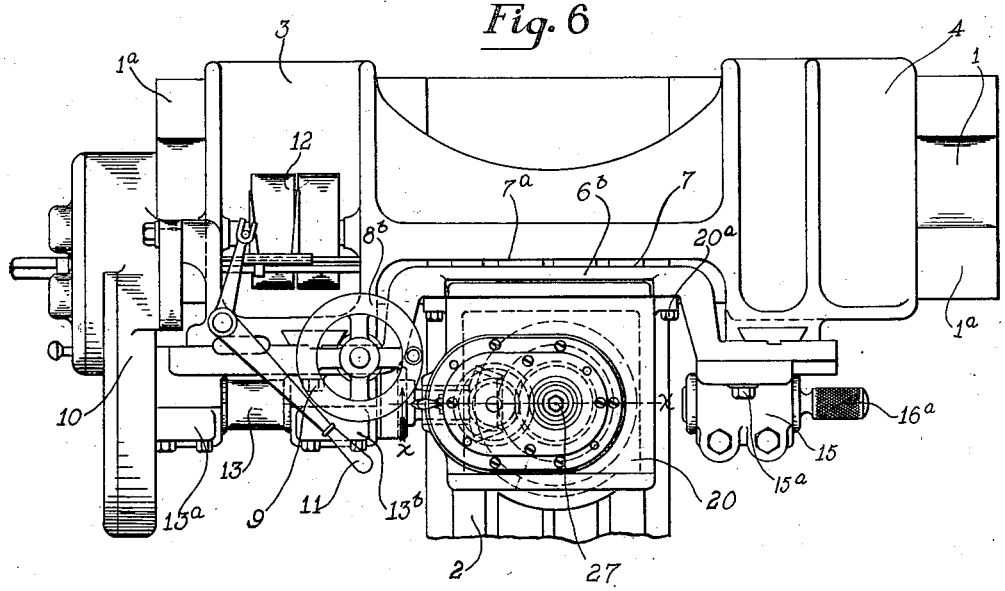
Fig. 6 is a plan view thereof.

The uprights 3 and 4 are provided with vertical guideways 3ª and 4ª thereon on which is adapted to be mounted a cutter-supporting rail 6. The rail is preferably arched inward at 7, as illustrated in Figs. 2, 4 and 6, whereby is provided sufficient room for mounting the cutter and for bringing its axis into alignment with the cutter-driving spindle, the connecting means for the uprights 3 and 4 being provided with a recess 7ª, as illustrated, for receiving the arched portion of the rail. This rail may be vertically adjusted on the guideways 3ª and 4ª by means of a screw 8 threaded into the rail and journaled into a bearing 8ª on the integral uprights 3 and 4. A hand wheel 8ᵇ is provided for rotating the screw. I also provide clamping means 9 for securing the rail in its vertically adjusted position, the clamping bolts in Figs. 3 and 4 being shown as provided with operating levers 9ª. The spindle driving mechanism supported on the uprights and rail and including change speed mechanism is shown generally at 10, a lever 11 being adapted to shift a driving belt to and from the tight and loose pulleys 12. This driving mechanism within itself forms no part of the present invention and therefore will not be further described herein.

In Figs. 1 and 2, I have illustrated the rail 6 as being provided with a horizontally arranged cutter spindle 13 mounted in bearings 13ª and 13ᵇ therein. Adjacent the upright 4 the rail is provided with a horizontal guideway 14 on which is mounted an end-supporting spindle bearing bracket 15. This bracket may be adjusted horizontally axially of the spindle and may be secured in adjusted position by means of a clamping bolt 15ª. The spindle bearing 16 within the bracket is provided with a handle 16ª for convenience in removing and adjusting the bearing. The spindle 13 and the bearing 16 always remain in axial alignment and are adapted to support a milling cutter 17 therebetween on an arbor 17ª, as illustrated in Figs. 1 and 2.

Figure 3:
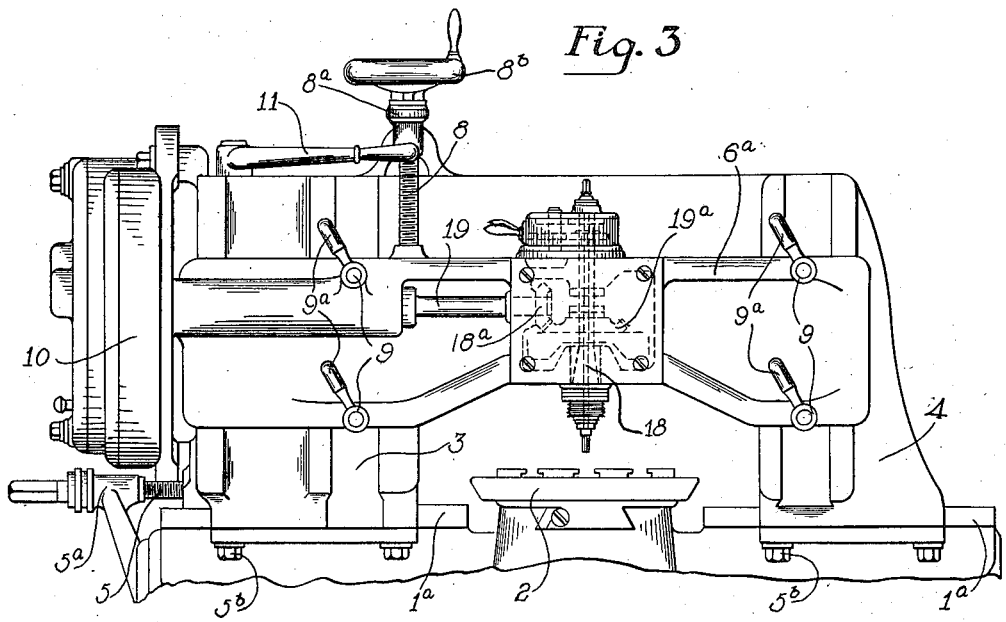
Fig. 3 is a view of the machine shown in Fig. 1 but having a vertical cutter spindle rail mounted thereon.
Figure 4:
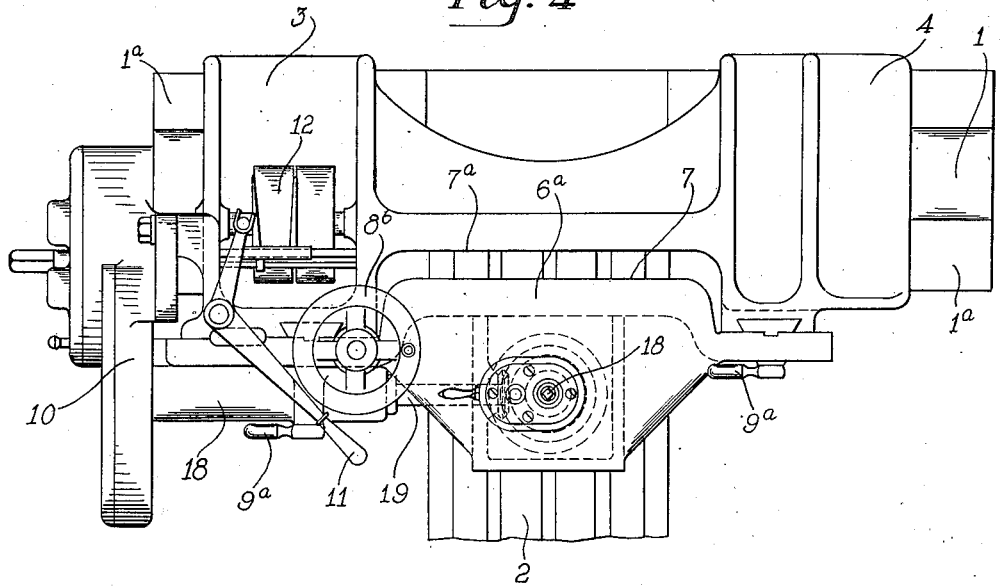
Fig. 4 is a plan view thereof.

In Figs. 3 and 4, I have illustrated a rail 6ª as mounted on the uprights 3 and 4 and I have illustrated this rail as provided with a vertical cutter spindle 18 mounted therein. The spindle is driven from a shaft 19 through meshing bevel gears 18ª and 19ª on the spindle and shaft respectively. It will be noted that the location of the driving shaft 19 is substantially that of the spindle 13 shown in Figs. 1 and 2 and the rail is otherwise like the rail shown in Figs. 1 and 2. The details of the vertical spindle shown herein form a part of the subject matter of my copending application Serial No. 377,725, filed April 29th, 1920.

Figure 5:
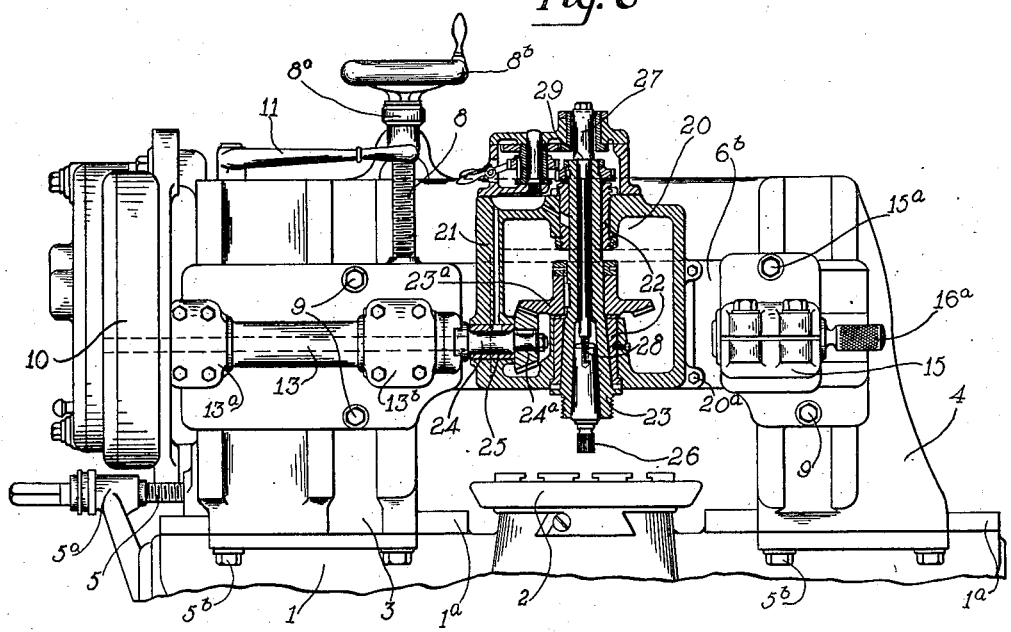
Fig. 5 is a view of the machine shown in Fig. 1 with a vertical spindle attachment mounted on the cutter-supporting rail thereof, the attachment being shown in section in Fig. 5 taken on the line $x-x$ of Fig. 6.

In Figs. 5 and 6 I have illustrated a rail 6ᵇ as mounted on the uprights 3 and 4. This rail is substantially the rail 6 shown in Figs. 1 and 2, the arched portion thereof, however, being provided with threaded holes for receiving the bolts 20ª of a vertical spindle milling attachment 20. This attachment comprises a box-like casing 21 within which are bearings 22 for the vertical cutter spindle 23. A large bevel gear 23ª on the spindle is in meshing position with a bevel gear 24ª on a stub shaft 24 mounted in a bearing 25 in the casing 21. The outer end of this shaft is provided with means for operatively connecting the shaft to the horizontal cutter spindle 13 from which the vertical cutter spindle 23 is driven. As illustrated, the vertical spindle assembly may be readily attached to the horizontal spindle rail when it is desired to use a vertical cutter spindle without changing the cutter-supporting rail and when the assembly is removed, the horizontal cutter spindle 13 in the rail is adapted to receive a horizontal cutter, as the cutter 17 shown in Figs. 1 and 2. The cutter 26 is held in its socket by means of a screw 27 extending axially through the spindle and threadedly engaging the shank of the cutter at 28 and provided with a shoulder 29 seated on the upper end of the vertical cutter spindle 23. The details of the spindle mechanism herein illustrated form the subject matter of my copending application Serial No. 377,725, filed April 29th, 1920, wherein such mechanism is more fully described.

What I claim is:

1. In a milling machine, the combination of a base having horizontal ways thereon, a work table mounted between the ways, an upright mounted on each way, the uprights being rigidly connected together, unitary means for adjusting the uprights as a unit on the ways transversely of the table, means on the uprights for rotatably supporting a milling cutter over the table, and means for driving the cutter.

2. In a milling machine, the combination of a base having horizontal ways thereon, a work table slidably mounted between the ways, an upright mounted on each way, the uprights being rigidly connected together, a screw for adjusting the uprights as a unit on the ways transversely of the table movement, a cutter spindle rotatably supported by the uprights above the table, and means for driving the spindle.

3. In a milling machine, the combination of a base having horizontal ways thereon, a work table mounted between the ways, two integrally connected uprights respectively mounted on the ways, a screw for adjusting the uprights as a unit on the ways, clamping means for securing the uprights in adjusted position, means on the uprights for rotatably supporting a milling cutter over the table, and means for driving the cutter.

4. In a milling machine, the combination of a base having horizontal ways thereon, a work table slidably mounted between the ways, an upright mounted on each way, the uprights being rigidly secured together and adapted to be adjusted as a unit on the ways transversely of the table movement, a cutter supporting rail mounted on the uprights, means on the rail for rotatably supporting a milling cutter over the table, and means for driving the cutter.

5. In a milling machine, the combination of a base having horizontal ways thereon, a work table mounted between the ways, an upright mounted on each way, the uprights being secured together as a unit, screw means for adjusting such unit on its ways transversely of the table, a cutter-supporting rail mounted on the uprights, a cutter spindle mounted on the rail above the table, and means for driving the spindle.

6. In a milling machine, the combination of a base having horizontal ways thereon, a work table mounted between the ways, an upright mounted on each way, the uprights being integrally connected together, means for adjusting and clamping the uprights on the ways, a cutter-supporting rail mounted on the uprights, a cutter spindle mounted on the rail above the table, and means for driving the spindle.

7. In a milling machine, the combination of a base having horizontal ways thereon, a work table mounted between the ways, an upright mounted on each way, the uprights being secured together and adapted to be adjusted as a unit on the ways, a cutter-supporting rail mounted on the uprights, screw means for adjusting the rail vertically on the uprights, means for clamping the rail in adjusted position, a cutter spindle mounted on the rail above the table, and means for driving the spindle.

8. In a milling machine, the combination of a base having horizontal ways thereon, a work table mounted between the ways, an upright mounted on each way, the uprights being secured together as a unit, a screw for adjusting such unit on its ways transversely of the table, a cutter-supporting rail mounted on the uprights, screw means for adjusting the rail vertically on the uprights, a cutter spindle mounted on the rail above the table, and means for driving the spindle.

9. In a milling machine, the combination of a base, two integrally connected uprights mounted thereon, a work table between the uprights, the uprights being adjusted on the base as a unit transversely of the table, a cutter-supporting rail mounted on the uprights, the rail being arched between the uprights and over the table, a cutter spindle mounted on the rail and adapted to support a milling cutter adjacent the arched portion thereof, and means for driving the spindle.

10. In a milling machine, the combination of a base having horizontal ways thereon, a work table slidably mounted between the ways, an upright mounted on each way, the uprights being permanently connected together and adapted to be adjusted as a unit on the ways transversely of the table movement, means on the uprights for rotatably supporting a milling cutter over the table with its axis extending in a horizontal direction, and means for driving the cutter.

11. In a milling machine, the combination of a base having horizontal ways thereon, a work table mounted between the ways, two integrally connected uprights mounted respectively on the ways, means for adjusting the uprights on the ways as a unit, a horizontal cutter spindle supported above the table by the uprights, and means for driving the spindle.

12. In a milling machine, the combination of a base having horizontal ways thereon, a work table mounted between the ways, two integrally connected uprights mounted on the ways, a screw for adjusting the uprights on the ways, clamping means for securing the uprights in adjusted position, a cutter spindle supported horizontally above the table by the uprights, and means for driving the spindle.

13. In a milling machine, the combination of a base having horizontal ways thereon, a work table mounted between the ways, an upright mounted on each way, the uprights being secured together as a unit and adapted to be simultaneously adjusted on the ways, a cutter-supporting rail mounted on the uprights, a cutter spindle mounted horizontally on the rail above the table, and means for driving the spindle.

14. In a milling machine, the combination of a base having horizontal ways thereon, a work table mounted between the ways, an upright mounted on each way, the uprights being integrally connected together, means for adjusting and clamping the uprights on the ways, a cutter-supporting rail mounted on the uprights, a cutter spindle mounted horizontally on the rail above the table, and means for driving the spindle.

15. In a milling machine, the combination of a base having horizontal ways thereon, a work table mounted between the ways, an upright mounted on each way, the uprights being rigidly secured together, unitary means for adjusting the uprights on the ways as a unit, a cutter-supporting rail mounted on the uprights, screw means for adjusting the rail vertically on the uprights, means for clamping the rail in adjusted position, a cutter spindle mounted horizontally on the rail above the table, and means for driving the spindle.

16. In a milling machine, the combination of a base having horizontal ways thereon, a work table slidably mounted between the ways, an upright mounted on each way, the uprights being secured together as a unit, screw means for adjusting such unit on its ways transversely of the table movement, a cutter-supporting rail mounted on the uprights, screw means for adjusting the rail vertically on the uprights, a cutter spindle mounted horizontally on the rail above the table, and means for driving the spindle.

17. In a milling machine, the combination of a base, two connected uprights mounted theereon, a work table between the uprights, a cutter-supporting rail mounted on the uprights, the rail being arched between the uprights and over the table, a cutter spindle mounted horizontally on the rail and adapted to support a milling cutter adjacent the arched portion thereof, and means for driving the spindle.

18. In a milling machine, the combination of a base having horizontal ways thereon, a work table mounted between the ways, an upright mounted on each way, the uprights being integrally connected together and adapted to be adjusted on the ways, a horizontal cutter spindle and a cutter end-supporting bearing cooperating with the spindle and mounted for vertical adjustment on the uprights, and means for driving the spindle.

19. In a milling machine, the combination of a base having horizontal ways thereon, a work table mounted between the ways, an upright mounted on each way, the uprights being integrally connected together and adapted to be adjusted on the ways, a cutter-supporting rail mounted on the uprights, a cutter spindle mounted horizontally on one end of the rail at one side of the table, a cutter end-supporting bearing cooperating with the spindle and mounted on the other end of the rail for longitudinal adjustment therealong, and means for driving the spindle.

20. In a milling machine, the combination of a base having horizontal ways thereon, a work table mounted between the ways, an upright mounted on each way, the uprights being integrally connected together and adapted to be adjusted on the ways, a cutter-supporting rail mounted on the uprights, a cutter spindle mounted horizontally on one end of the rail at one side of the table, a cutter end-supporting bearing cooperating with the spindle and mounted on guideways on the other end of the rail for longitudinal adjustment therealong, the bearing being in axial alignment with the spindle in all positions of adjustment, means for clamping the bearing in adjusted position, and means for driving the spindle.

21. In combination with a milling machine having a support and a rotary driver thereon, an attachment comprising the combination of a housing adapted to be rigidly secured to the support, a cutter spindle journaled in the housing, a driving gear on the spindle, a second gear mounted in the housing and meshing with the driving gear, and means operatively connecting the driver and second gear when the housing is so rigidly mounted.

22. In combination with a milling machine having a work table, a support thereover and a rotary driver on the support, an attachment comprising the combination of a housing adapted to be rigidly secured to the support over the table, a cutter spindle journaled vertically in the housing, a driving gear on the spindle, a second gear mounted in the housing and meshing with the driving gear, and means operatively connecting the driver and second named gear when the housing is so rigidly mounted.

23. A milling machine attachment comprising the combination of a housing adapted to be rigidly secured to a milling machine provided with a horizontal spindle, a cutter spindle journaled vertically in the housing, a driving gear on the spindle, a countershaft journaled in the housing, and a second gear on the countershaft meshing with the driving gear, the countershaft extending without the housing and being adapted to be connected with the horizontal spindle of the milling machine when the housing is secured in place.

24. In a milling machine, the combination of a base having an upright thereon, a work table mounted on the base, a cutter-supporting head vertically adjustably mounted on the upright, a cutter spindle mounted horizontally in the head, a vertical cutter spindle adjacent and operatively connected to the horizontal spindle, the vertical spindle being removable and the horizontal spindle being adapted to receive an operating tool thereon, and means for driving the spindles.

25. In a milling machine, the combination of a base having an upright thereon, a work table mounted on the base, a cutter-supporting head vertically adjustably mounted on the upright, a cutter spindle mounted horizontally in the head, a vertical cutter spindle adjacent the horizontal spindle, means operatively connecting the two spindles including a countershaft and meshing bevel gears on the countershaft and vertical spindle respectively, the vertical spindle being removable and the horizontal spindle being adapted to receive an operating tool thereon, and means for driving the spindles.

26. In a milling machine, the combination of a base, a work table mounted on the base, an upright mounted on the base and adjustable transversely of the work table, a cutter-supporting head vertically adjustably mounted on the upright, a cutter spindle mounted horizontally in the head, a vertical cutter spindle adjacent and operatively connected to the horizontal spindle, the vertical spindle being removable and the horizontal spindle being adapted to receive an operating tool thereon, and means for driving the spindles.

27. In a milling machine, the combination of a base having horizontal ways thereon, a work table mounted between the ways, an upright mounted on each way, a cutter-supporting rail mounted on the uprights, a cutter spindle mounted horizontally on the rail, a vertical spindle mounted on the rail over the table and operatively connected to the horizontal spindle, the vertical spindle being removable and the horizontal spindle being adapted to receive an operating tool thereon, and means for driving the spindles.

28. In a milling machine, the combination of a base having horizontal ways thereon, a work table mounted between the ways, an upright mounted on each way, the uprights being rigidly connected together, a cutter-supporting rail mounted on the uprights, a cutter spindle mounted horizontally on the rail, a vertical cutter spindle mounted on the rail over the table and operatively connected to the horizontal spindle, the vertical spindle being removable and the horizontal spindle being adapted to receive an operating tool thereon, and means for driving the spindles.

29. In a milling machine the combination of a base having horizontal ways thereon, a work table mounted between the ways, an upright mounted on each way, the uprights being integrally connected together, a cutter-supporting rail mounted on the uprights, a cutter spindle mounted horizontally on the rail, a vertical cutter spindle mounted on the rail over the table and operatively connected to the horizontal spindle, the vertical spindle being removable and the horizontal spindle being adapted to receive an operating tool thereon, and means for driving the spindles.

30. In a milling machine, the combination of a base having horizontal ways thereon, a work table mounted between the ways, an upright mounted on each way, a cutter-supporting rail mounted on the uprights, a cutter spindle mounted horizontally on the rail at one side of the table, an end-supporting bearing for the spindle mounted on the rail at the other side of the table, a vertical cutter spindle mounted on the rail over the table and operatively connected to the horizontal spindle, the vertical spindle being removable and the horizontal spindle being adapted to receive an operating tool thereon, and means for driving the spindles.

31. In a milling machine, the combination of a base having horizontal ways thereon, a work table mounted between the ways, an upright mounted on each way, a cutter-supporting rail mounted on the uprights, a cutter spindle mounted horizontally on the rail, a vertical cutter spindle assembly mounted on the rail over the table, such assembly comprising a housing having a vertical spindle mounted therein and means operatively connected to the vertical spindle and adapted to be connected to the horizontal spindle and be driven thereby, the assembly being removable and the horizontal spindle being adapted to receive an operating tool thereon, and means for driving the spindles.

32. In a milling machine, the combination of a base having horizontal ways thereon, a work table mounted between the ways, an upright mounted on each way, a cutter-supporting rail mounted on the uprights and arched horizontally inward over the table, a cutter spindle mounted horizontally on the rail at one side of the arched portion thereof, a vertical cutter spindle assembly mounted in the arched portion of the rail, such assembly comprising a housing having a vertical spindle mounted therein and means operatively connected to the vertical spindle and adapted to be connected to the horizontal spindle and be driven thereby, the assembly being removable and the horizontal spindle being adapted to receive an operating tool thereon, and means for driving the spindles.

33. In a milling machine, the combination of a base having horizontal ways thereon, a work table mounted between the ways, an upright mounted on each way, a cutter-supporting rail mounted on the uprights, a cutter spindle mounted horizontally on the rail, a vertical cutter spindle assembly mounted on the rail over the table, such assembly comprising a housing having a vertical spindle mounted therein, a bevel gear mounted on the vertical spindle and engaging a bevel gear on a countershaft mounted in the assembly and adapted to be operatively connected to the horizontal spindle and be driven thereby, the assembly being removable and the horizontal spindle being adapted to receive an operating tool thereon, and means for driving the spindles.

34. In a milling machine, the combination of a base, a work table mounted thereon, two uprights on the base positioned at opposite sides of the work table, said uprights being adapted to interchangeably support two rails having respectively vertical and horizontal spindles thereon, and driving connections in said rails for said spindles.

35. In a milling machine, the combination of a base, a work table mounted thereon, two uprights on the base positioned at opposite sides of the table, said uprights being transversely adjustable and adapted to interchangeably support two rails having respectively vertical and horizontal spindles thereon, and driving connections in said rails for said spindles.

36. In a milling machine, the combination of a base, a work table mounted thereon, two uprights on the base positioned at opposite sides of the table, said uprights being permanently connected together and adapted to interchangeably support two rails having respectively vertical and horizontal spindles thereon, and driving connections in said rails for said spindles.

37. In a milling machine, the combination of a base, a work table mounted thereon, two uprights on the base positioned at opposite sides of the table and adapted to interchangeably support two vertically movable rails thereon having respectively vertical and horizontal spindles thereon, and driving connections in said rails for said spindles.

38. In a milling machine, the combination of a base, a work table mounted thereon, two uprights on the base positioned at opposite sides of the table, said uprights being adapted to interchangeably support two rails having respectively vertical and horizontal spindles, clamping means for said uprights and rails, and driving connections in said rails for said spindles.

In testimony whereof, I hereto affix my signature.

JERRY J. LA DUCER.